April 29, 1952  J. W. MILLER  2,595,160
VALVE
Filed May 16, 1946

INVENTOR.
JOHN W MILLER
BY
Carroll R. Taber

Patented Apr. 29, 1952

2,595,160

UNITED STATES PATENT OFFICE 2,595,160

VALVE

John W. Miller, Lansing, Mich., assignor to Motor Wheel Corporation, Lansing, Mich., a corporation of Michigan Application May 16, 1946, Serial No. 670,173

3 Claims. (Cl. 277—32)

This invention relates to valves for regulating the flow of gaseous fuels to a burner, and particularly to such valves for use in gas burning cooking ranges.

Valves of the type mentioned are usually of the rotary plug type. Such valves are capable of rotation about 90°, but due to their peculiar characteristics, only a limited part of that rotation is employed for regulating the flow of fuel. Hence the adjustment of the valves to provide a predetermined flow of fuel is extremely critical.

The principal object of the present invention is to provide a valve of the rotary plug type in which substantially the entire range of rotary movement is utilized in regulating the flow of fuel.

Another object is to provide such a valve in which the rate of flow of fuel is substantially proportional to the degree of rotation of the valve between its open and closed positions.

Another object is to provide a valve having these characteristics and in which a positive shut off for the fuel is provided.

These objects are attained by providing a fuel flow regulator separate from the rotary plug, the regulator being movable axially of the plug and valve body as the plug is rotated.

Figure 4:
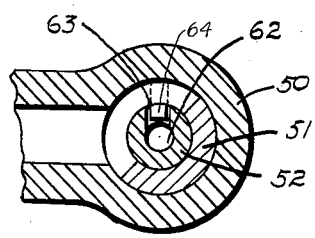
Figure 4 is a fragmentary cross-sectional view taken on substantially the line 4—4 of Figure 2.

In the drawings there is disclosed one form of the invention. In the construction shown there are three major parts, a valve body 50, a rotary plug 51, and a fuel regulator 52. The valve is adapted to be associated with a conventional Venturi mixing tube, not shown.

The valve body has an axial bore therein comprising a tapered portion 53 and a cylindical portion 54. The axially outer end of the latter is threaded at 55. The axially inner end of portion 54 is threaded to receive a member 56 having a fixed metering orifice 57 therethrough. A centrally apertured plate 58 is attached to the outer end of the valve body. A tubular neck 59 at one side of the valve body provides for connection of the valve to a source of gas supply and admits gas to the interior of the valve body.

The plug 51 is tapered to fit the tapered portion 53 of the bore in the valve body and fits snugly but rotatably therein. The plug 51 extends well past the open inner end of the neck 59. The axially outer end of the plug extends through the apertured plate 58 and has a handle 65 attached thereto.

Figure 2:
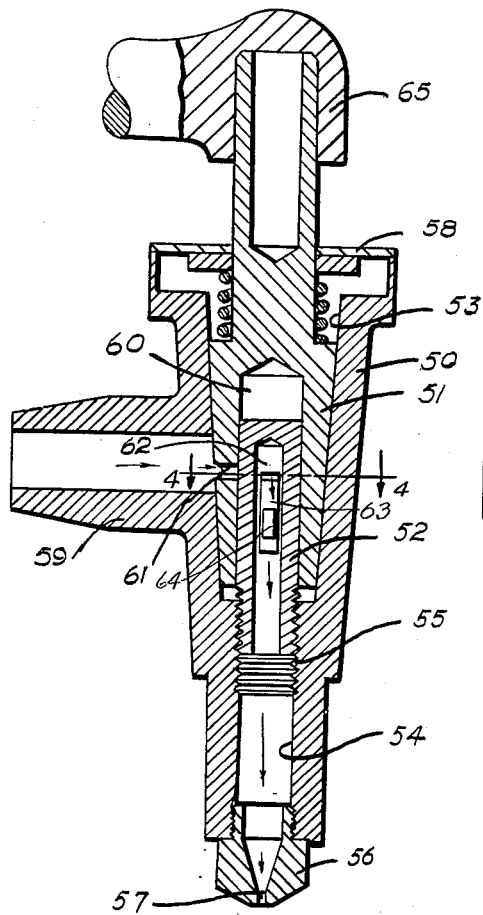
Figure 2 is a cross-sectional view similar to Figure 1 showing the valve in partially opened position.

The plug 51 is provided with an axially extending recess, preferably, although not necessarily, of circular cross-section. In a wall of the recess is an angularly elongated opening 61 which registers with the open inner end of the neck 59 (as in Figure 2) when the valve is open, and is out of registry with the opening in the neck when the valve is closed (Figure 1).

The fuel regulator 52 is of the same cross-sectional configuration as that of the recess 60 in the plug, and fits slidably therein. The axially inner end of the regulator 52 is threaded and is received by threads 55 in the bore 54. The fuel regulator 52 is provided with an axial recess 62 opening axially inwardly and extending nearly the full length thereof. An axially elongated slot 63 is cut in one wall of the recess below the opening 61 in the plug wall. A pin 64, nearly as thick as the width of slot 63, and considerably shorter than the slot, extends into the slot from the wall of the plug 51, to which it is fixed.

Figure 3:
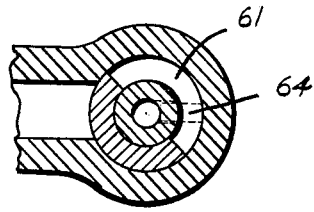
Figure 3 is a fragmentary cross-sectional view taken on substantially the line 3—3 of Figure 1.
Figure 1:
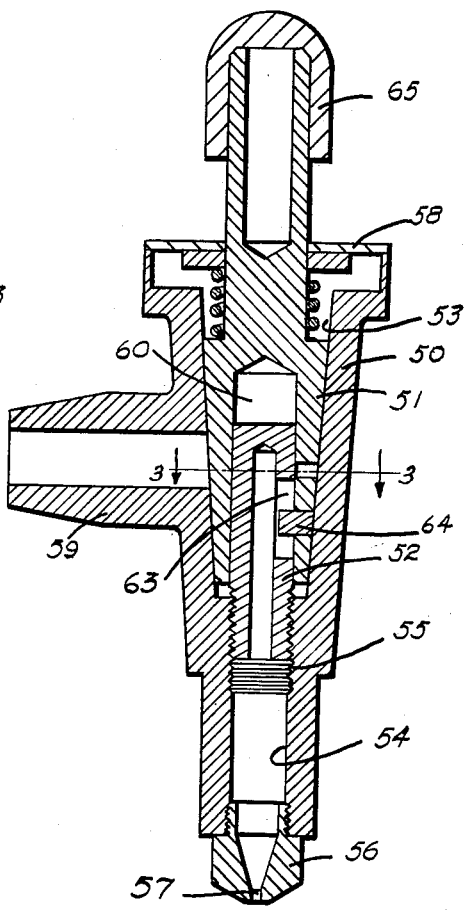
Figure 1 is an axial cross-sectional view of a plug type valve embodying the invention, the valve being shown in closed position.

When the valve parts are in the positions shown in Figures 1 and 3, the valve is closed. Opening 61 is out of registry with the opening in neck 59, while slot 63 does not register with opening 61. When handle 65 is rotated, opening 61 moves into registry with the opening in neck 59. At the same time, the fuel regulator is rotated because of the pin 64 and slot 63 connection between the parts 51 and 52. Due to the threads 55, the member 52 is moved axially outwardly so that the upper end of the slot 63 registers with opening 61. Gas then flows, as indicated by the arrows in Figure 6, through the valve body and orifice 57 to the burner.

If the valve is open, movement of the handle 65 in the opposite direction, of course, closes the valve.

From the foregoing it will be seen that the present invention provides a rotary plug type valve in which provision is made for substantially uniform regulation of fuel flow throughout a relatively wide range of rotary movement. This is possible because of the provision of a fuel regulating member movable axially of the plug and valve body. The fuel regulator, or at least that part thereof which meters the fuel, positive shut off of fuel, nor to prevent leakage of fuel. Thus, lubrication of that part is unnecessary, and the metering orifice or slot in the regulator can be made very small, without danger of becoming plugged with lubricant.

It will be evident that the invention is susceptible of numerous variations from the specific embodiments shown, and is therefore to be limited only by the scope of the appended claims.

I claim:

1. A metering valve for gaseous fuel comprising a tubular valve body having a fuel inlet port in a side thereof, a rotary plug closing one end of said tubular valve body and an outlet orifice at the other end of the valve body, said rotary plug having an axially extending recess in its inner end and a circumferential slot through the side wall of said plug and communicating with said axial recess, a fuel regulating member in said valve body and plug and adjustable axially thereof and controlling the flow of fuel from said inlet port through the valve body and plug to the outlet orifice, said fuel regulating member being connected to said plug for axial movement relative thereto as said plug is rotated, said plug being rotatable to one position where said slot communicates with said fuel inlet port and to another position where said slot is offset from the fuel inlet port and the rotary plug serves as a valve for positively closing the fuel inlet port, said fuel regulating member being provided with an outlet passage communicating with said outlet orifice and having a fuel metering port therein communicating with said outlet passage, said fuel regulating member being movable axially relative to and in response to rotation of said plug member to bring said metering port progressively into and progressively out of registration with said circumferential slot whereby the quantity of gas flowing through said valve can be accurately controlled by the rotative position of said plug member.

2. A metering valve as set forth in claim 1 wherein said circumferential slot extends continuously around a substantial portion of said rotary plug, said metering port on said regulating member extending axially of said rotary plug a greater extent than said circumferential slot, said metering port being offset axially inwardly of said circumferential slot when said plug member is rotated to said position wherein said circumferential slot is offset from said fuel inlet port.

3. A metering valve for gaseous fuel comprising a tubular valve body having a fuel inlet port in a side thereof, a rotary plug closing one end of said tubular valve body and an outlet orifice at the other end of the valve body, said rotary plug having an axially extending recess in its inner end and a circumferential slot through the side wall of said plug and communicating with said axial recess, a fuel regulating member in said valve body and plug and adjustable axially thereof and controlling the flow of fuel from said inlet port through the valve body and plug to the outlet orifice, said fuel regulating member being connected to said plug for axial movement relative thereto as said plug is rotated, said plug being rotatable to one position where said slot communicates with said fuel inlet port and to another position where said slot is offset from the fuel inlet port and the rotary plug serves as a valve for positively closing the fuel inlet port, said fuel regulating member having an axial recess therein communicating with said outlet orifice and having a fuel metering port in the wall thereof communicating with said last mentioned axial recess, said fuel regulating member being movable axially relative to and in response to rotation of said rotary plug member to bring said metering port progressively into and progressively out of registration with said circumferential slot, said metering port comprising an axially extending slot in the wall of said fuel regulating member and having an axial extent greater than said circumferential slot, and including a guide member in the wall of said plug member projecting into said metering port, said guide member permitting axial movement of said fuel regulating member relative to said plug member but preventing rotary movement of said fuel regulating member relative to said plug member.

JOHN W. MILLER.

REFERENCES CITED

The following references are of record in the file of this patent:

UNITED STATES PATENTS

| Number | Name | Date |
|---|---|---|
| 795,715 | Lofton | July 25, 1905 |
| 1,088,103 | Schreidt | Feb. 24, 1914 |
| 1,766,554 | Sieber | June 24, 1930 |
| 1,832,228 | Mattson | Nov. 17, 1931 |
| 1,921,895 | Taurisano | Aug. 8, 1933 |
| 2,079,348 | Hann | May 4, 1937 |
| 2,183,825 | Steffen | Dec. 19, 1939 |
| 2,260,474 | Mueller | Oct. 28, 1941 |

FOREIGN PATENTS

| Number | Country | Date |
|---|---|---|
| 130,155 | Great Britain | of 1919 |